United States Patent [19]

Hood et al.

[11] 4,159,745
[45] Jul. 3, 1979

[54] CROP UPROOTING AND SOIL WORKING APPARATUS

[75] Inventors: Clarence E. Hood; Byron K. Webb, both of Clemson, S.C.; Yekutiel Alper, Bet Dagan, Israel

[73] Assignee: Clemson University, Clemson, S.C.

[21] Appl. No.: 859,227

[22] Filed: Dec. 9, 1977

[51] Int. Cl.$^2$ .................... A01B 39/12; A01B 39/19
[52] U.S. Cl. .................................. 172/44; 171/134; 172/48
[58] Field of Search .................. 172/28, 35, 36, 44, 172/66, 48; 171/134

[56] References Cited
U.S. PATENT DOCUMENTS

| | | | |
|---|---|---|---|
| 2,892,504 | 6/1959 | Mowbray | 172/44 |
| 2,954,085 | 9/1960 | Roberts | 172/44 |
| 3,108,642 | 10/1963 | Hunter | 172/44 |

Primary Examiner—Paul E. Shapiro
Attorney, Agent, or Firm—Wellington M. Manning, Jr.; Luke J. Wilburn, Jr.

[57] ABSTRACT

An elongated bar soil working apparatus constructed so that a plurality of bars are supported in a parallel relationship for rotation in one or more horizontal planes and positioned closely adjacent each other whereby the corners of one bar will cooperate with the corners of an adjacent bar to effect a severing action on vines or other foliage moving therebetween whereby the bars are self-cleaning. Power drives are operatively associated with the bars for syncronous rotation of the bars whereby the corners of the bars will be simultaneously advanced through a common plane in closely positioned relationship to effect the severing action on the vines and other foliage located therebetween and prevent vine and foliage build up on the bars. The present apparatus includes a frame which will allow the apparatus to be removably supported by conventional tractor operable tool bar whereby the bars can be advanced through the soil to perform plant uprooting or other soil working operations.

12 Claims, 6 Drawing Figures

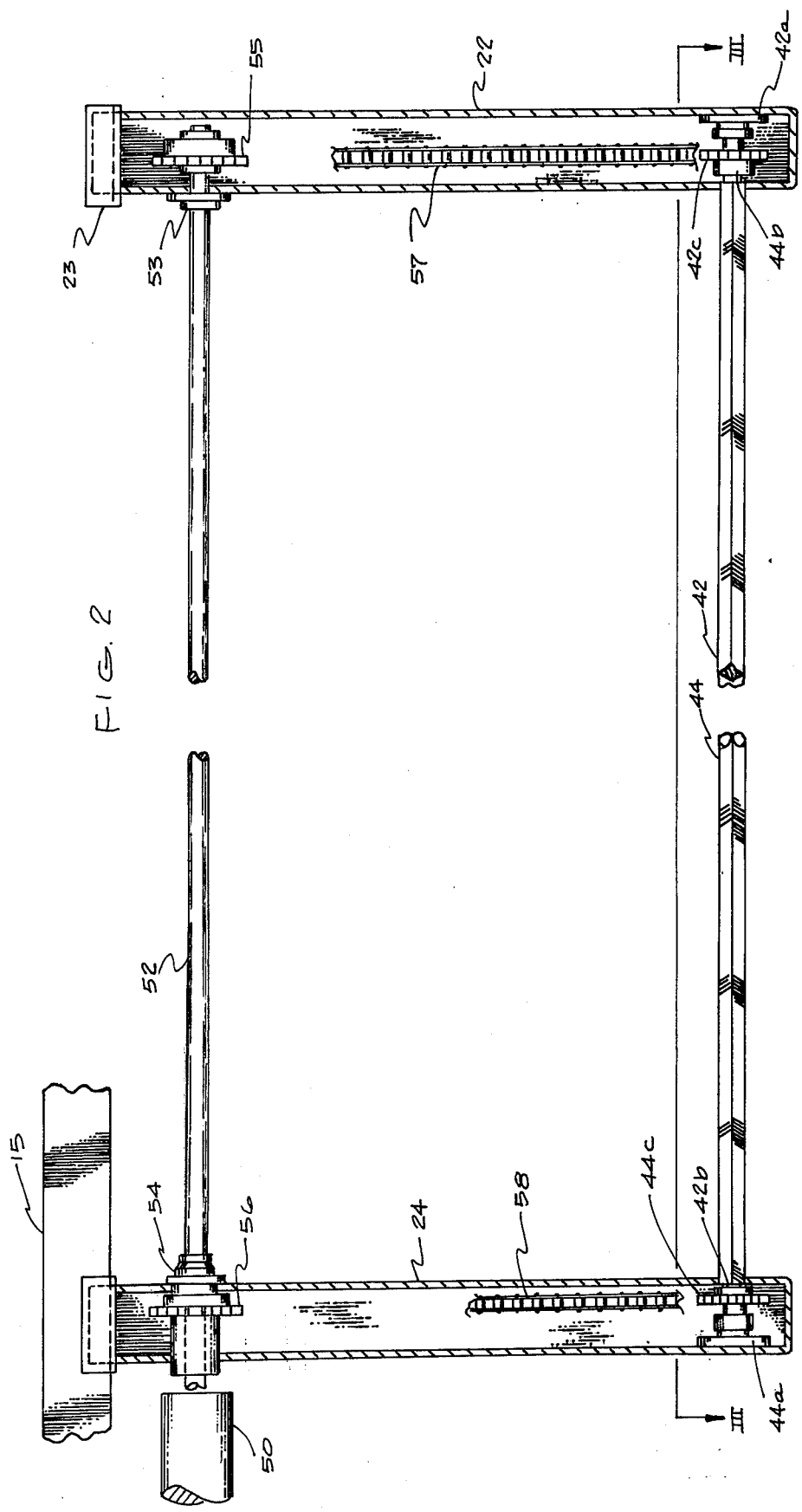

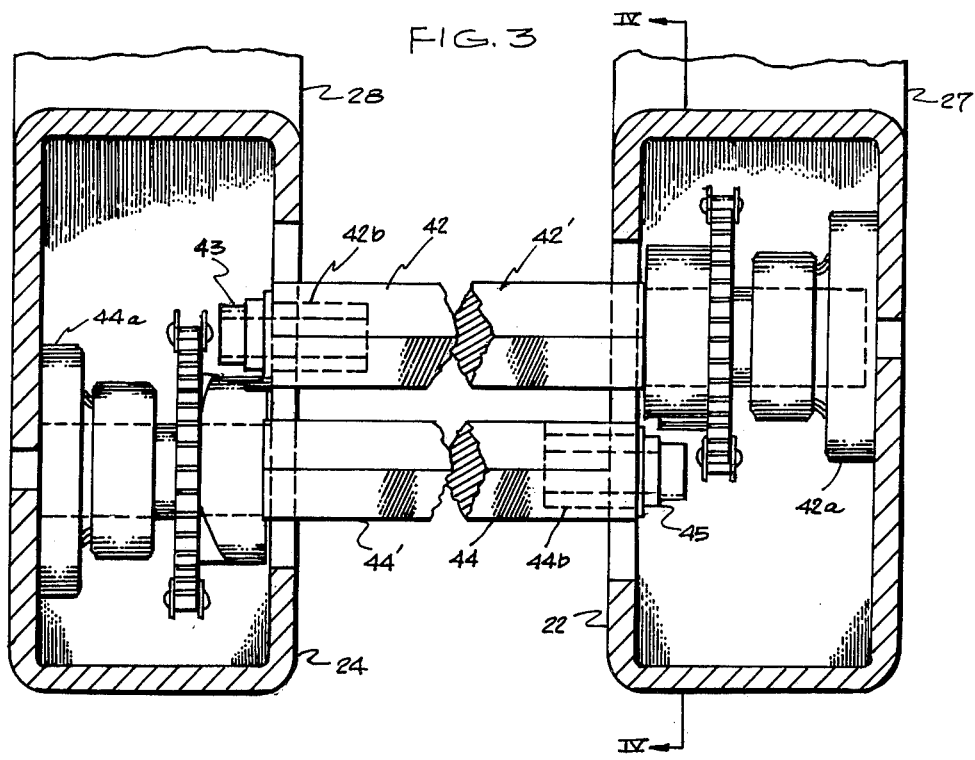
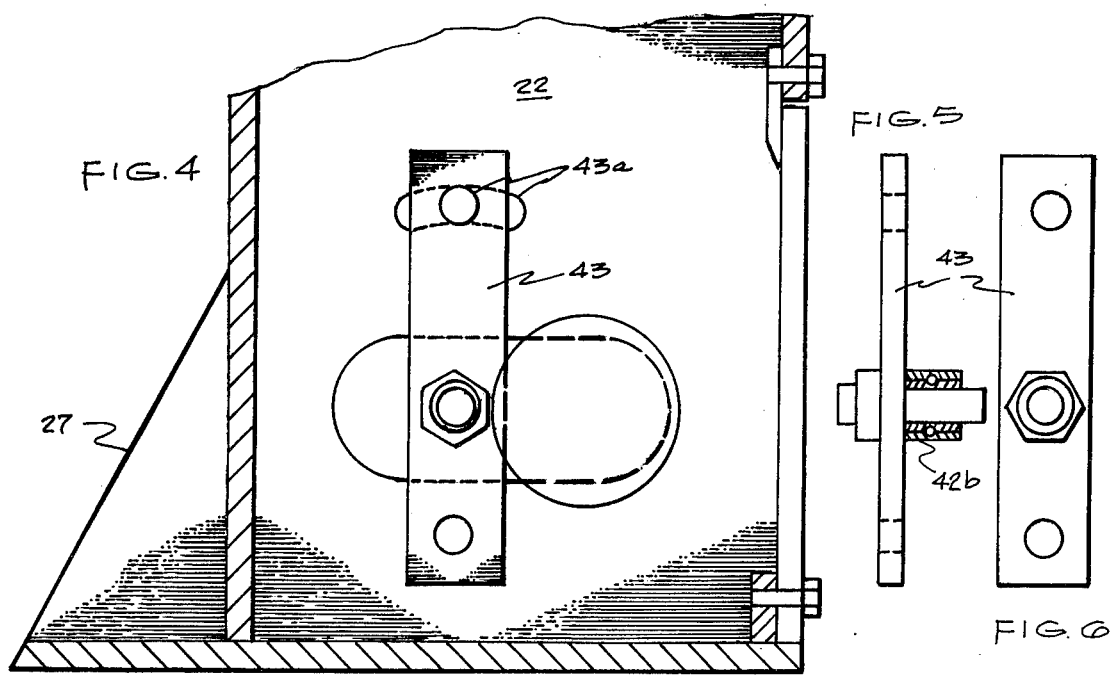
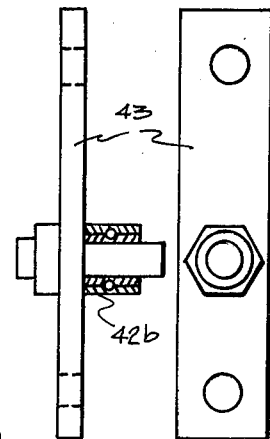

CROP UPROOTING AND SOIL WORKING APPARATUS

BACKGROUND OF THE INVENTION

The present invention relates to a power driven soil working apparatus and is more particularly concerned with means for performing a plant uprooting operation prior to a mechanical harvesting operation.

It has been demonstrated to be practical to sever and uproot various row crops, such as tomatoes, to allow a degree of wilting of the plants prior to a mechanical harvesting operation. Also, working of the soil prior to harvesting can help to dry a wet field sufficient to permit an otherwise impractical harvesting operation.

Certain of the prior art harvesters for tomatoes, cucumbers, potatoes, onions and the like have included sickle bars, stationary shear knives, rotating horizontal discs and the like, operable for cutting plants before fruit harvesting.

Moreover, harvesters disclosed in U.S. patents to Malley et al, U.S. Pat. No. 3,690,383, issued Sept. 12, 1972, and Roberts, U.S. Pat. No. 2,954,085, issued Sept. 27, 1960, both include a pair of horizontally oriented rotating bars, one positioned for operation below the surface of the soil for severing crop roots, and the other being vertically and horizontally spaced from the first in a trailing relationship for operation above the soil surface to elevate the severed plants. The rotating bars disclosed in each of these patents require a substantial spacing in order to perform the desired severing and elevating operations.

The prior art discs and sickle bar units require considerable horsepower and the wear problems are substantial. The stationary cutting knives will not work satisfactorily in excessively weedy conditions or with certain soil conditions, such as high moisture. Rotating bars disclosed in the prior art, though successful in many respects, will not work properly in weeds and heavy foliage due to considerable wrapping of foliage around the individual bars to a point where machine down time is required to clean the bars.

The plural bar system of the present invention represents improvement in the art in that the problems referred to above are overcome thereby. In fact, the plural bar system of the present invention operates efficiently on a continuous basis at high harvesting speeds.

SUMMARY OF THE INVENTION

It is a primary object of the present invention to provide apparatus which will effectively sever and uproot crops prior to a mechanical harvesting operation while preventing excessive wrapping of foliage around the apparatus during operation, particularly when used in weedy field conditions.

Another object of the present invention is to provide improved uprooting and soil working apparatus which is supportable on conventional tractor operable tool bar means.

An additional object of the present invention is to provide a crop uprooting and soil working apparatus which is simple in construction and operation, economical to manufacture and reliable in performance.

These and other objects and advantages of details of construction will become apparent from reading the following description of preferred embodiments with reference to the attached drawings.

BRIEF DESCRIPTION OF THE DRAWINGS

FIG. 2 is a partial vertical sectional view taken substantially transversely through the support housings, omitting certain parts for purpose of clarity.

FIG. 3 is a horizontal sectional view taken along a line III—III of FIG. 2.

FIG. 4 is a fragmentary sectional view taken along a line IV—IV of FIG. 3.

FIGS. 5 and 6 are end and side elevational views respectively, showing details of bar adjustment brackets according to the present invention.

DESCRIPTION OF THE PREFERRED EMBODIMENTS

Figure 1:
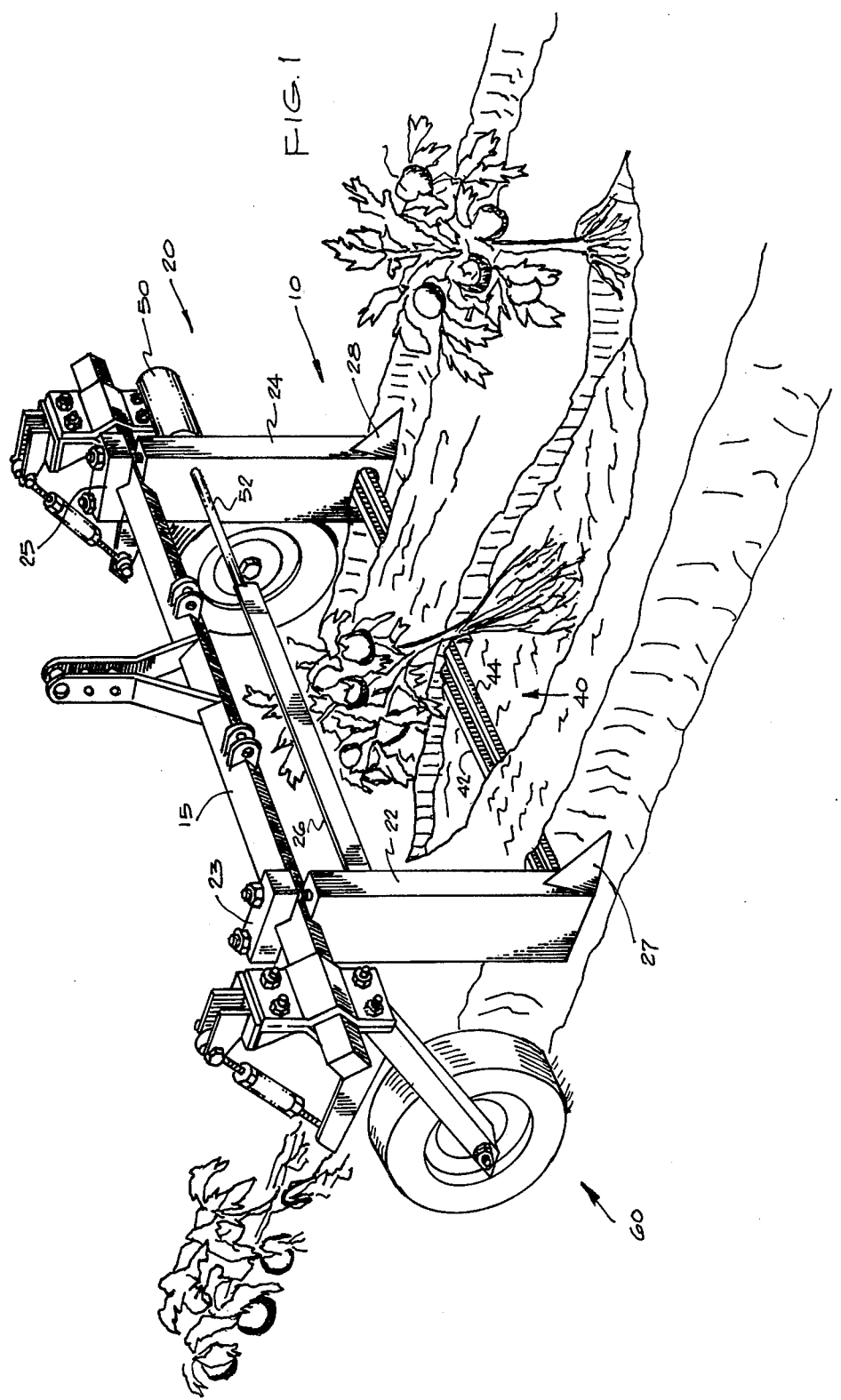
FIG. 1 is a perspective view of a crop uprooting apparatus embodying principles of the present invention.

Referring to the Figures, preferred embodiments of apparatus embodying the principles of the present invention will be described in detail. The crop uprooting and soil working apparatus of the present invention is generally indicated as 10 and includes a frame support means generally indicated as 20 which has a crop uprooting and soil working assembly generally indicated as 40 received thereon.

The frame support means 20 includes a pair of vertically oriented, horizontally spaced support standards 22 and 24, constructed of conventional metal stock material to form a box housing for supporting the soil working assembly 40, as will be described in more detail herebelow. Each of the standards 22 and 24 includes a conventional tool bar clamp means 23 and 25, respectively, provided on the upper ends thereof. Clamp means 23 and 25 are employed for securing the present apparatus 10 to a conventional tractor operable tool bar 15 which does not per se form a part of the present invention. The apparatus of the present invention can thus be advanced along a crop row during a soil working or crop uprooting operation and can be adjusted from an inoperative, transport position to operative, working positions. An angle support member 26 is secured between standards 22 and 24, in a horizontally oriented position adjacent an upper edge thereof. As shown in FIGS. 1 and 4, soil piercing plow points 27 and 28 may be provided adjacent a lower leading edge of standards 22 and 24, respectively, to foster penetration and the advancement of the standards through the soil during the crop uprooting and soil working operation.

Making particular reference to FIGS. 1 through 3, the soil working or crop uprooting assembly 40 includes a plurality of shaped bars 42 and 44 which are supported in parallel relationship in a horizontal plane (FIG. 3) adjacent the lower ends of standards 22 and 24. Preferably, two shaped bars 42 and 44 are employed and are located in a generally common horizontal plane. Moreover, shaped bars 42 and 44 are preferably square in cross section. It should be pointed out, however, that more than two bars may be employed, and that the cross section of same may be other than square so long as corners are provided thereon. Also the plane in which the bars are employed is incidental except that edges or corners of the plurality of bars should contact edges or corners of an adjacent bar to achieve the foliage severing, self-cleaning function. Bars 42 and 44 are rotatably supported at one end by fixed bearings 42a, 44a and at an opposite end by adjustable bearings 42b, 44b, respectively, which are received on standards 22, 24. The bars 42 and 44 are spacially supported so that the angled corners 42' and 44' of the bars will pass closely adjacent each other to effect the severing action of vines or other foliage located therebetween and prevent wrapping of the material on the bars. Bars 42, 44 are also synchronally driven so that the angled corners 42' and 44' of same are simultaneously advanced through a common plane adjacent each other to effect the above described severing and self-cleaning action.

The adjustable bearings 42b, 44b are shown in dotted lines in FIG. 3 and are received in openings therefor that are formed in the ends of bars 42 and 44, with bearing 42b being supported by standard 24 and bearing 44b being supported by standard 22. As shown in FIGS. 3–6, bearings 42b and 44b are supported for adjustment by brackets 43 and 45, respectively, which are supported within the standard housings and are selectively adjustable by conventional slot and bolt connecting means 43a and 45a (not shown). The adjustable bearings will permit the spacing between bars 42 and 44 to be set as needed to perform the self-cleaning action.

As shown in FIG. 2, bars 42 and 44 are driven by a conventional hydraulic motor 50 which is secured to standard 24 and is operated through connecting hydraulic hose means (not shown) to a conventional tractor hydraulic system. Motor 50 is connected to a drive shaft 52 which is supported by bearings 53 and 54 mounted on standards 22 and 24, respectively. Drive shaft 52 is provided with a pair of axially spaced sprockets 55 and 56 which are located within standards 22 and 24 and are in driving engagement with chains 57 and 58, respectively. Chain 58 is received in driving engagement around a bar sprocket 42c that is secured to bar 42 and chain 57 is received in driving engagement around a bar sprocket 44c secured to bar 44. The drive sprockets 55 and 56 and 42c and 44c and chains 57 and 58 are all supported within the box housings of the standards for protection during operation. Removable plates (not shown) may be provided adjacent the upper and lower end of standards 22 and 24 for servicing the bar supports and drive means. Motor 50 is detailed to effect a rotation of bars 42 and 44 (FIG. 3) opposite the direction of movement of apparatus 10 along a crop row to cause plants coming into contact with the bars during advancement through a crop bed to be uprooted and deposited generally on top of the soil.

As shown in FIG. 1, conventional adjustable wheel assemblies generally indicated as 60 may be provided on opposite ends of tool bar 15 for use in adjusting and gauging the depth of penetration or working depth of the bars 42, 44. Wheel assemblies 60 may not be needed and full support of apparatus 10 may be obtained from the tractor through tool bar 15.

Apparatus embodying the principles of the present invention may be used in a crop uprooting operation, as a rod weeder, or can be used in working chemicals, such as fertilizers or herbicides, into the soil. In using the apparatus 10 of the present invention, the frame support means 20 is attached to a conventional tool bar 15 for transport and for advancing through a field during operation. The hydraulic motor 50 is connected to the tractor hydraulic system and the tractor hydraulic controls are operated to effect rotation of the bars 42 and 44. The tractor lift system is used to raise and lower the apparatus to selected operating positions or for adjustment to a non-operable, transport position. After the apparatus is supported on a tractor, the tractor is used to advance the bars 42 and 44 along a crop row, with the bars preferably adjusted to operate just below the ground surface, as shown in FIG. 1, to effect an uprooting of plants prior to a mechanical harvesting operation.

The above described apparatus is effective for eliminating vine or foliage wrapping and is effective to orient plant roots in a horizontal direction that allows easy pick up by a harvester traveling in the same direction. Considerable soil is removed from the plant roots by the rotating action of the bars. The apparatus functions satisfactorily for uprooting tomato plants grown on plastic covered paper mulch which is becoming a common production practice. Roots are freed below the mulch without disturbing the mulch.

The apparatus gently uproots the plants through a "wave action" effect without shattering the fruit and will function substantially trouble free very near the ground surface without regard to soil moisture conditions. In fact, the present apparatus can be employed in a field too wet for harvesting and effects a drying action on the soil.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. Crop uprooting and soil working apparatus comprising:
   (a) at least two elongated bars, said bars being shaped to define at least one angled edge thereon;
   (b) means supporting said at least two bars in parallel relationship with said bars shaped to define said angled edges being in sufficient close proximity to cooperate to sever vines and other foliage moving therebetween; and
   (c) means for effecting rotation of said bars whereby said bars uproot crops and work soil during advancement, and said angled cutting edges cyclically advance into cooperation with said adjacent bar to effect severing of vines and foliage therebetween, whereby said apparatus is self-cleaning.

2. Apparatus as defined in claim 1 wherein two bars are provided, both of said bars being supported for syncronous rotation.

3. Apparatus as defined in claim 1 wherein both of said bars are square in cross section to define four angled edges.

4. Apparatus as defined in claim 3 wherein both of said bars are in the same general horizontal plane.

5. Apparatus as defined in claim 1 wherein said bars are supported at opposite ends by a pair of support standards, one of said bars being drivingly supported at each standard.

6. Apparatus as defined in claim 1 wherein said means for effecting rotation of said bars is associated with said support means.

7. Apparatus as defined in claim 6 wherein said means for effecting rotation of said bars comprises hydraulic motor means having releasable couplings which can be operatively associated with a tractor hydraulic drive system.

8. Apparatus as defined in claim 1 wherein said support means for said bars includes clamp means, whereby said apparatus can be removably mounted on conventional tractor supported tool bar means.

9. Crop uprooting and soil working apparatus comprising:
  (a) a pair of vertically oriented, horizontally spaced support standards, with each standard including means located adjacent an upper edge of said standards for attachment to a transport means;
  (b) a pair of shaped bars rotatably supported by said standards in parallel relationship in a horizontal plane, said bars having angled edges thereon, and being located proximate each other to permit angled edges of same to sever foliage passing therebetween; and
  (c) drive means for said bars supported on said standards for syncronally rotating said bars whereby advancement of said bars beneath the surface of a crop bed will effect an uprooting of plants grown on said bed, and severing of foliage between said bars will preclude foliage build up around said bars.

10. Apparatus as defined in claim 9 wherein said bars are square in cross section.

11. Apparatus as defined in claim 9 wherein said support standards are boxed housings, one of said bars being drivingly supported in one of said standards and the other of said bars being drivingly supported in the other of said standards.

12. Apparatus as defined in claim 9 wherein said drive means comprises a hydraulic motor means for both of said bars, said hydraulic motor being associated with a single drive shaft, said shaft being drivingly connected to one end of each bar.

* * * * *